(No Model.)

F. I. MAULE.
SCREW CUTTING DIE.

No. 512,983. Patented Jan. 16, 1894.

Witnesses:
A. V. Groupe
Frank E. Bechtold

Inventor:
Francis I. Maule
by his Attorneys
Howson & Howson

THE NATIONAL LITHOGRAPHING COMPANY,
WASHINGTON, D. C.

UNITED STATES PATENT OFFICE.

FRANCIS I. MAULE, OF PHILADELPHIA, PENNSYLVANIA.

SCREW-CUTTING DIE.

SPECIFICATION forming part of Letters Patent No. 512,983, dated January 16, 1894.

Application filed May 7, 1892. Serial No. 432,158. (No model.)

*To all whom it may concern:*

Be it known that I, FRANCIS I. MAULE, a citizen of the United States, and a resident of Philadelphia, Pennsylvania, have invented certain Improvements in Screw-Cutting Dies, of which the following is a specification.

The object of my invention is to provide a cheap, strong, and durable form of screw cutting die provided with uniformly tempered cutting bits rigidly secured in place by simple means and so constructed as to provide good clearances, and this object I attain in the manner hereinafter set forth, reference being had to the accompanying drawings, in which—

Figure 1:
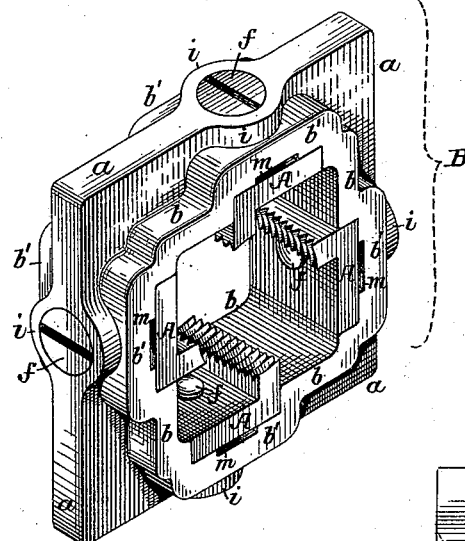
Figure 4:
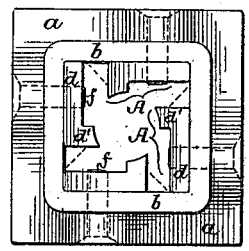
Figure 3:
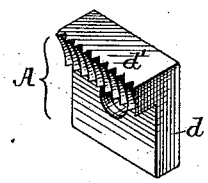
Figure 2:
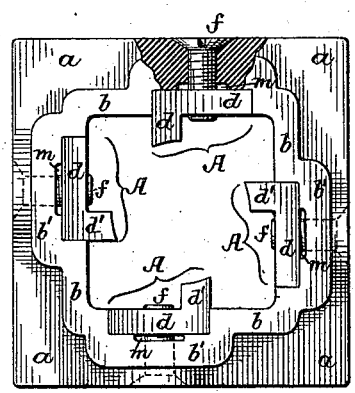

Figure 1, is a perspective view of a screw cutting die constructed in accordance with my invention. Fig. 2, is a front view of the die partly in section. Fig. 3, is a perspective view of one of the cutting bits; and Fig. 4, is a front view on a reduced scale of a modified form of the die.

The die has a series of bits A, four in the present instance, these bits being mounted in a holder or frame B which, owing to the number of bits used, is, in the present instance, of quadrangular form, although, if a greater or less number of bits are used, the form of the holder or frame may be correspondingly changed.

The frame B is made of any suitable metal, preferably of malleable iron or cast steel, and consists of a plate $a$ less in thickness than the width of the bits A but having on each side around the central opening in the plate, a raised rib or flange $b$ in which, on each side of the opening, is an offset portion $b'$ so as to form a recess for the reception of the bit. Each bit is composed of hardened steel and has two members $d\ d'$ angularly disposed in respect to each other, preferably at right angles, the member $d$ being snugly seated in a recessed portion of the flanged holder so that it is confined thereby at both ends, the bit being retained in the recessed portion of the holder by means of a screw $f$ the head of which is adapted to an enlarged portion or boss $i$ formed upon the plate $a$ of the holder. The shorter member $d'$ of the bit projects into the opening of the die holder and has the cutting teeth formed upon it as shown in Figs. 1 and 3, so that when the die is applied to the end of a rod or tube and is rotated thereon, the teeth of the bits will cut the proper thread upon said rod or tube.

Owing to the angular form of each bit, the same is rendered extremely rigid, perfect clearance of the cutting teeth is insured and provision is afforded for rigidly securing each bit in its proper place in the holder so that it is impossible for either of the bits to move in any direction, and uniform cutting effect of the bits is thereby insured, the die being practically as effective in its operation as a die made in one piece, while it possesses the advantage over a solid die, that the cutting bits, being small, can be uniformly tempered throughout, and a die made in accordance with my invention is, of course, much cheaper than a solid steel die. The cutting bits can, moreover, be removed when desired and ground or sharpened.

The recessed portions of the holder are preferably planed or milled so as to permit of the accurate fitting of the cutting bits therein, and in order to lessen the amount of surface thus to be prepared I form in each of the recessed portions $b'$ of the holder a secondary recess $m$.

In Fig. 4 I have illustrated a simpler form of my improved die in which the recesses in the holder are dispensed with, the bits A being fitted in the angles of the quadrangular opening in the holder. A lug such as shown by dotted lines may in this case, if desired, be used to confine each bit at the cutting end.

Having thus described my invention, I claim and desire to secure by Letters Patent—

1. The combination of the cutting bits each consisting of a base portion, and a portion projecting at an angle from one side of said base and having a series of cutting teeth formed thereon, the base portion being much wider than the cutting portion, and the teeth extending across the latter portion in a direction transversely to its length, with a holder having a central opening for the reception of said bits, and screws for securing the base portions of the bits to seats against the walls of said opening so that the cutting portions of the bits will project inwardly, substantially as specified.

2. The combination of the cutting bits each having a base portion and a portion projecting at an angle from one side of said base and having a series of cutting teeth formed thereon, the base portion being much wider than the cutting portion and the teeth extending across the latter portion in a direction transversely to its length, with a holder recessed for the reception of the base portions of the cutting bits so as to confine the same on three sides, and screws for confining said bases of the bits to their seats in said recesses so that the cutting portions of the bits will project inwardly, substantially as specified.

3. The combination of the cutting bits, with the holder having an opening for receiving the bits, said holder consisting of a plate thinner than the length of the bits but having on each side, around the opening therein, a continuous rib or flange whereby that portion of the plate which receives the cutting bits is thickened, so as to equal the length of the bits substantially as specified.

4. The combination of the cutting bits, the confining screws therefor, the plate having a central opening, and on each side a rib or flange around said opening, and bosses or enlargements for the reception of the screws whereby the bits are confined, substantially as specified.

In testimony whereof I have signed my name to this specification in the presence of two subscribing witnesses.

FRANCIS I. MAULE.

Witnesses:
FRANK E. BECHTOLD,
HARRY SMITH.